3,076,290
FLOWER POTS
Joseph Gallo, 938 East St., Walpole, Mass.
Filed July 18, 1961, Ser. No. 124,836
4 Claims. (Cl. 47—39)

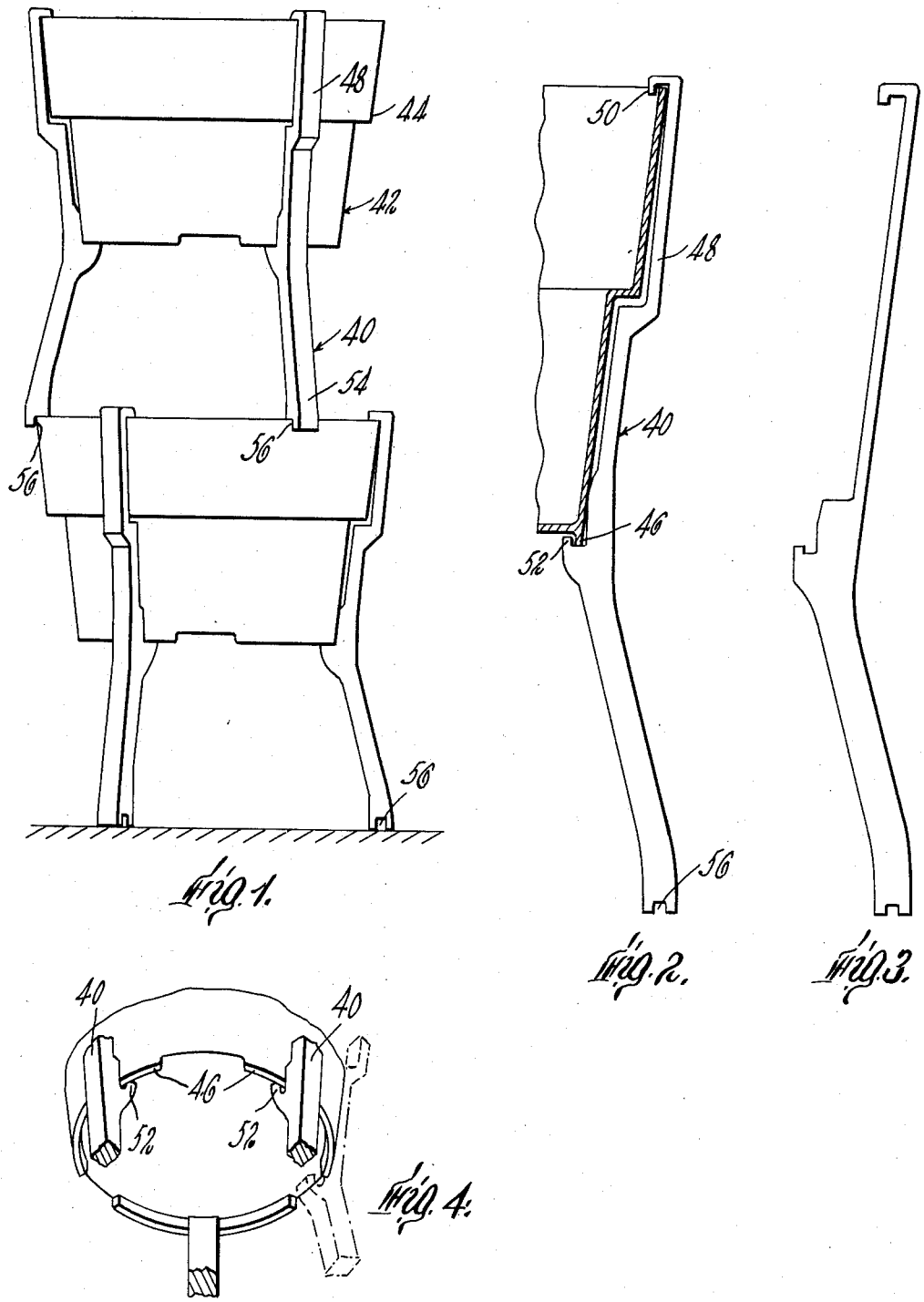

The present invention relates to improvements in flower pots, and more particularly to an improved flower pot assembly including the flower pot and associated detachable flower pot supporting legs, constructed and arranged for supporting the flower pot individually and in tiered separated relation for the efficient growing of plants, as for example bulbs in a confined space.

It is an object of the invention to provide an improved flower pot assembly including a pot and associated detachable pot supporting legs which will provide a greater flexibility in the use of such flower pots permitting the pot to be readily nested for storage and shipping and to be readily assembled with said detachable supporting legs for use in a raised position off the floor or ground.

More specifically it is an object of the invention to provide a novel construction and arrangement of the flower pot and associated detachable supporting legs which will adapt such pots to be readily assembled with their supporting legs for tiering one above another in separated relation for the efficient growing of plants, such as bulbs, for example, in a confined space.

It is still another object of the invention to provide a simple and effective leg preferably of plastic which is readily attached to a flower pot of standard construction for the mounting of such flower pots either individually in a raised position, or in tiered relation one above the other.

With these and other objects in view as may hereinafter appear, the several features of the invention will be readily understood from the following description taken in connection with the accompanying drawings in which:

FIG. 1 is a view in elevation of two flower pots mounted in tiered relation to one another, on my improved flower pot supporting legs;

FIG. 2 is a side view on a larger scale of a supporting leg attached to a flower pot, shown in section;

FIG. 3 is a view of the supporting leg similar to that shown in FIG. 2 reshaped for larger scale production; and FIG. 4 is a fragmentary perspective view of a flower pot and supporting legs illustrating the manner of attachment.

The embodiment of the invention shown comprises generally a flower pot and detachable leg assembly which is preferably made from molded plastic or a similar suitable material, and is adapted for a wide range of uses including the erection of a plurality of said pots in tiered relation one above the other on a vertical axis.

Referring more specifically to the drawing, the improved flower pot supporting leg 40 shown in FIGS. 1, 2, and 4 is adapted to be attached to a flower pot 42 of ordinary description which is preferably circular in shape having the side wall 44 thereof tapered outwardly for convenience in nesting, and with a circular ridge 46 extending downwardly from the bottom of the pot, which is broken away at intervals to permit a free circulation and drainage of water to and from the bottom of said pot. Flower pots of this description are made of any suitable material, as for example, a plastic which is unaffected by water, or by the chemicals normally employed in plant culture.

It is contemplated that three detachable flower pot supporting legs 40 will be secured to the outside wall of each pot at equally spaced intervals around the circumference thereof. Each said detachable supporting leg 40 comprises a resiliently formed clamping portion 48 formed at its upper end with a hook 50 which is arranged to engage the top rim of the pot, and a bottom upwardly facing hook 52 which engages the circular ridge 46 extending downwardly from the bottom of the pot. The leg 40 is further provided with a downwardly and outwardly extending leg portion 54 which at its lower end has formed therein a downwardly facing slot 56. The shape of the downwardly extending leg and the location of the slot 56 are so chosen as to cause the notch to engage accurately with the top rim of the next lower pot of the tier when the pots are of identical size and shape and are positioned in tiered relation on the same vertical axis. In the embodiment shown the wall 44 of the pot is jogged outwardly at substantially its midpoint providing a somewhat enlarged upper portion of the pot, and a convenient shoulder for engagement with shouldered portions of next adjacent pots, to prevent freezing of the pots within one another when assembled in a nested relation. The clamping portion 48 of the detachable leg 40 is slightly bowed as shown in FIG. 2 so that the two hooks 50 and 52 are biased toward one another and into clamping engagement with the top and bottom rims of the pot respectively. FIG. 4 of the drawings illustrates a modified design of my improved detachable flower pot supporting leg in which the clamping portion 48 of the detachable supporting leg 40 is streamlined for increased flexibility which will assist in the operation of mounting and demounting the detachable legs from the flower pot.

In the preferred embodiment of the invention shown, it is contemplated that the detachable leg 40 will be mounted by first engaging the hook 50 with the top rim of the pot, thereafter sliding the lower hook 52 inwardly under the pot through a broken away portion of the bottom rim as shown in dotted lines in FIG. 4, and thereafter working the leg around the periphery of the pot a sufficient distance so that the lower hook 52 is brought into engagement with the circular ridge 46 extending downwardly from the bottom of the pot in the manner shown in solid lines in FIG. 4 and in FIGS. 1 and 2.

The improved detachable flower pot leg shown has the great advantage that it is readily applied to existing pots in order to adapt such pots readily for use under conditions where it is necessary to lift the pots off the ground, and for tiering when so desired for the starting or development of plants in a confined space such as may be provided in a green house or potting shed. The plastic legs shown have the further advantage that they are simple and inexpensive to manufacture, can be stored and shipped in compact packages, and are readily applied and thereafter detached from the pots with a minimum of effort and without risk of injury to the plants contained in said pots.

The invention having been described what is claimed is:

1. A flower pot assembly which comprises, in combination, a plurality of similarly formed flower pots arranged to be tiered in spaced relation one above the other on the same vertical axis, each said flower pot having a bottom surface with a ridge extending downwardly from the edges of said bottom surface, and a circularly arranged outwardly sloping side wall, and at least three detachable supporting legs arranged at spaced intervals about the periphery of said pots, each leg comprising a portion extending the height of said side wall with hook portions overlying said side wall and underlying said ridge providing cooperating locking surfaces on each said pot and on each said detachable supporting leg for securing each said leg to the pot in a predetermined position in which said leg projects downwardly and outwardly from the bottom of said pot, and each said leg is further formed with a downwardly facing notch positioned to engage the top rim of the next lower of said tiered pots.

2. A flower pot assembly which comprises, in combination, a plurality of similarly formed flower pots arranged to be tiered in spaced relation one above the other on the same vertical axis, each said pot having a top rim and an intermittently formed bottom circular ridge extending downwardly from the bottom of said pot, and at least three detachable supporting legs spaced at intervals about the periphery of the upper one of any two tiered pots, each said leg having a resiliently formed portion thereof extending up the side of the pot with a hook overlying the top rim and a second oppositely formed hook engaging said bottom ridge, and having a further downward extension of said leg formed with a downwardly facing notch positioned to engage the top rim of the next lower pot of said tier.

3. For use with a flower pot assembly comprising a plurality of flower pots tiered in spaced relation above one another on the same vertical axis, each pot having outwardly tapered sides and in which each said flower pot is provided with circular ridge having portions thereof broken away extending downwardly from the bottom of said pot, a detachable supporting leg having a portion thereof extending from the bottom to the top rim of said pot formed with a hook overlying the top rim of the pot and a second oppositely formed hook underlying and engaging said bottom ridge, and having a further downward extension of said leg formed with a downwardly facing notch positioned to engage the top rim of the next lower pot of said tier.

4. For use with a flower pot assembly including a flower pot having a top rim and an intermittently formed circular ridge extending downwardly from the bottom of said pot, a detachable supporting leg having a resiliently formed portion thereof arranged to extend up the side of the pot with a hook arranged to overlie the top rim and a second oppositely formed hook arranged to engage said bottom ridge, and having a further downward pot supporting extension.

References Cited in the file of this patent
UNITED STATES PATENTS

| | | |
|---|---|---|
| 921,694 | Hall | May 18, 1909 |
| 1,209,938 | Collins | Dec. 26, 1916 |
| 2,235,709 | Hearn et al. | Mar. 18, 1941 |